Figure 1:
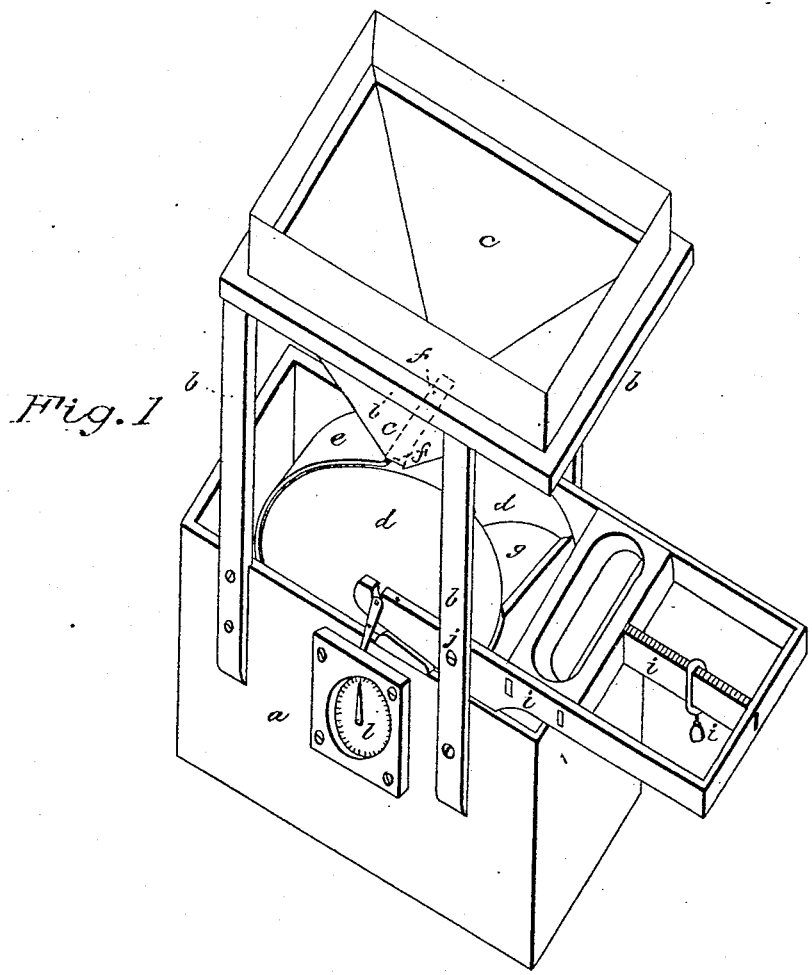

BROCKETT & BROWN.
Grain Meter.

No. 96,878.

Patented Nov. 16, 1869.

Witnesses
B. P. Phelps
W. S. Curtall

Inventors
Thomas Brockett
Joseph J. Brown

UNITED STATES PATENT OFFICE.

THOMAS BROCKETT AND JOSEPH J. BROWN, OF DAVENPORT, IOWA.

IMPROVEMENT IN GRAIN-METERS.

Specification forming part of Letters Patent No. 96,878, dated November 16, 1869.

*To all whom it may concern:*

Be it known that we, THOMAS BROCKETT and JOSEPH J. BROWN, of Davenport, in the county of Scott and State of Iowa, have invented certain new and useful Improvements in Grain-Meters; and we do hereby declare that the following is a full, clear, and exact description thereof, reference being had to the accompanying drawings, making part of this specification, and to the letters of reference marked thereon, like letters indicating like parts whenever they occur.

To enable others skilled in the art to construct and use our invention, we will proceed to describe it.

Our meter consists of scales, with a revolving hopper, a funnel having an apron attached to its front end, a spring or other equivalent device, and an indicator, with the box and frame-work necessary to mount them. The scales may be made as nearly like ordinary scales as the conditions of the machine will admit of. The hopper is made like a wheel, having four compartments, and resting on the scales by means of a shaft, which runs through its center, permitting it to revolve whenever the weight necessary to tip the scales shall be upon it, thus discharging the grain already weighed, and presenting an empty compartment at the mouth of the funnel to be filled. The funnel, which is used to conduct the grain to the revolving hopper may be made like that in the model, or in any other desired form. Its mouth must be so constructed that the stream of grain running into the hopper will be thin, in order to insure that at the moment of revolving the partitions of the hopper will pass through it instantly. The apron, whose use is to cover that compartment in the hopper which is receiving grain, and thus prevent waste, and allow the compartment to be filled as much as may be necessary, must be so made as to cover rather more than one-fourth of the revolving hopper. It may be attached to the funnel as in the model, or in any other convenient way. The spring is used to so control the action of the revolving hopper as to prevent its partitions from striking too violently against the mouth of the funnel. It may be placed wherever it can best perform its office. The indicator, which will register every discharge of the revolving hopper, may have as many pointers as may be desired.

In operating our meter the weight is to be placed at the number of pounds desired to be weighed at each discharge, (fifteen pounds, being one-fourth of a bushel of wheat, will be a convenient number for wheat.) By this means the revolving hopper will be raised so that it cannot pass the mouth of the funnel (which the partition of the revolving hopper will press against) until the moment fifteen pounds have fallen upon the hopper, when the scales will tip, the hopper will discharge, and the indicator will register the weight.

Figure 2:
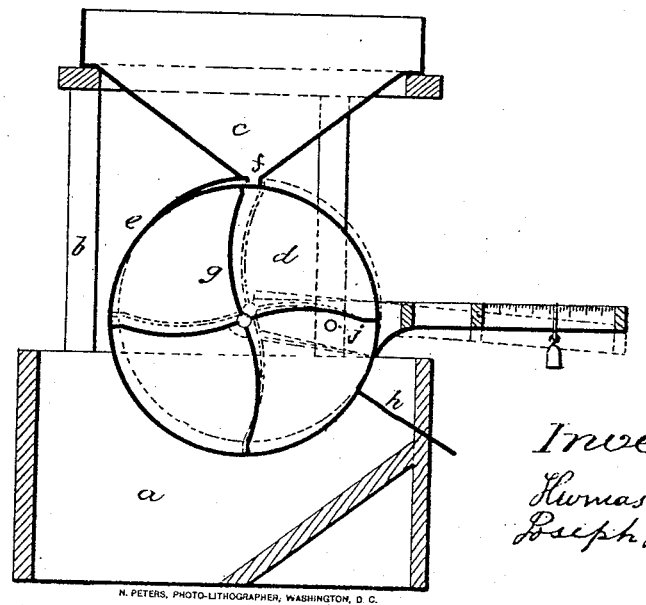

Figure 1 is an isometrical view of our invention. Fig. 2 is a longitudinal section.

$a$ is the box. $b$ is the frame supporting the funnel $c$. $d$ is the revolving hopper, showing the four compartments in the section drawing, Fig. 2. $e$ is the apron. $f$ is the mouth of the funnel. $g$ is the partition of the grain-hopper. $h$ is the spring to prevent the partitions of the hopper from striking the lower lip of the funnel too hard. The dotted lines in the section, Fig. 2, shows the revolving hopper in a position to be filled with grain. $i$ is the scale-bar and the weight. $j$ is the pivot to balance the revolving hopper and the scale-bar $i$. $k$ is hooked lever working upon the ratchet of the indicator and secured to the end of the scale-bar $i$. $l$ is the indicator.

Having thus described our invention, what we claim as our invention, and desire to secure by Letters Patent, is—

1. The combination of the stationary hopper $c$ with its apron $e$, the revolving hopper $d$, supported on the vibrating frame $i$, and having its partitions arranged to engage with the spout $f$ and stop $h$, all constructed and arranged to operate substantially as described.

2. The arrangement of the dial $l$ with its index operated by the hook or pawl $k$, attached to the vibrating frame, as set forth.

THOMAS BROCKETT.
JOSEPH J. BROWN.

Witnesses:
B. R. PHELPS, Jr.,
W. L. CARROLL.